(12) United States Patent
Walls

(10) Patent No.: US 7,961,256 B2
(45) Date of Patent: Jun. 14, 2011

(54) SYSTEM AND METHOD FOR BAD WEAVE DETECTION FOR INVERSE TELECINE

(75) Inventor: Frederick George Walls, Norristown, PA (US)

(73) Assignee: Broadcom Corporation, Irvine, CA (US)

( * ) Notice: Subject to any disclaimer, the term of this patent is extended or adjusted under 35 U.S.C. 154(b) by 1275 days.

(21) Appl. No.: 11/581,393

(22) Filed: Oct. 17, 2006

(65) Prior Publication Data
US 2008/0088746 A1 Apr. 17, 2008

(51) Int. Cl.
*H04N 7/01* (2006.01)
(52) U.S. Cl. ........................................................ 348/558
(58) Field of Classification Search .................. None
See application file for complete search history.

(56) References Cited

U.S. PATENT DOCUMENTS

| | | | | |
|---|---|---|---|---|
| 5,519,456 A * | 5/1996 | Inamori | ................. | 348/699 |
| 6,459,455 B1 * | 10/2002 | Jiang et al. | ................. | 348/452 |
| 6,567,468 B1 * | 5/2003 | Kato et al. | ................. | 375/240.12 |
| 6,633,612 B2 * | 10/2003 | Selby | ................. | 375/240.16 |
| 7,212,246 B2 * | 5/2007 | Jung et al | ................. | 348/448 |
| 7,307,664 B2 * | 12/2007 | Wong | ................. | 348/452 |
| 2007/0091205 A1 * | 4/2007 | MacInnis et al. | ................. | 348/448 |
| 2007/0091214 A1 * | 4/2007 | MacInnis et al. | ................. | 348/701 |
| 2007/0097259 A1 * | 5/2007 | MacInnis et al. | ................. | 348/441 |
| 2007/0103588 A1 * | 5/2007 | MacInnis et al. | ................. | 348/448 |

* cited by examiner

*Primary Examiner* — Paulos M Natnael
(74) *Attorney, Agent, or Firm* — Duane S. Kobayashi

(57) ABSTRACT

A system and method for bad weave detection for inverse telecine. To detect a bad weave artifact, the number of reversals of the difference polarity between successive lines within a column of samples is counted. The count of the number of reversals of the difference polarity is referred to as the polarity change count. In the execution phase, the polarity change count can be used by a bad weave detector to take a system out of lock. The polarity change count can also be used during the detection phase to detect a particular cadence.

17 Claims, 5 Drawing Sheets

SYSTEM AND METHOD FOR BAD WEAVE DETECTION FOR INVERSE TELECINE

BACKGROUND

1. Field of the Invention

The present invention relates generally to television signal decoding and, more particularly, to a system and method for bad weave detection for inverse telecine.

2. Introduction

Modern high-resolution and high-definition televisions require a method for displaying lower-resolution field-based content (e.g., SDTV, 1080i) in a high quality way. Some types of field-based content can be created through the conversion of a progressive source (such as film) using a process commonly referred to as telecine.

To illustrate the telecine process, consider for example the process of converting 24 frame/s film to 59.94 Hz NTSC video. NTSC is made up of fields, which are made up of every other horizontal scanline. One field contains all the odd numbered scanlines, while the next field contains all the even numbered scanlines. A frame is then the combination of two consecutive fields viewed at the same time. This process is called interlacing.

The conversion of 24 frame/s file to 29.97 frame/s NTSC interlaced video is known as 3:2 pulldown. In this conversion, there are approximately four frames of film for every five frames of NTSC video. These four frames are "stretched" into five by exploiting the interlaced nature of NTSC video. To illustrate this relation, consider the 3:2 pulldown of FIG. 1.

As illustrated, for every NTSC frame, there are actually two fields, one for the odd-numbered lines of the image, designated as the top field (TF), and one for the even-numbered lines, designated as the bottom field (BF). There are, therefore, ten NTSC fields for every four film frames. To accommodate this "stretching" the telecine process alternately places the first film frame across two fields, the second frame across three fields, the third frame across two fields, and the fourth frame across three fields. The cycle repeats itself completely after four film frames have been converted. As illustrated, the TF of the second film frame and the BF of the fourth film frame are duplicate copies.

The particular pulldown method that is applied is based on the type of film and the type of display format (e.g., NTSC, PAL, etc.). As such, various other pulldown methods such as 2:2, 5:5, 6:4, 8:7, etc. can be used for a given application To display field-based content that is generated by a particular telecine process on a modern television display, it is therefore necessary to recover the original progressive source content such as film. This source can be reconstructed from the field-based content using an inverse telecine process. In this inverse telecine process, it is critical that the correct cadence (e.g., 2:2, 3:2, 5:5, 6:4, 8:7, etc.) of the field-based content be identified so that the correct fields can be weaved together to produce the original progressive source.

If lines from temporally adjacent fields are combined inappropriately, then a "bad weave" can result. These bad weaves can result in an objectionable display. What is needed therefore is a mechanism that enables the proper detection of a cadence of the pulldown.

SUMMARY

A system and/or method for detection of a cadence of a telecine process, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
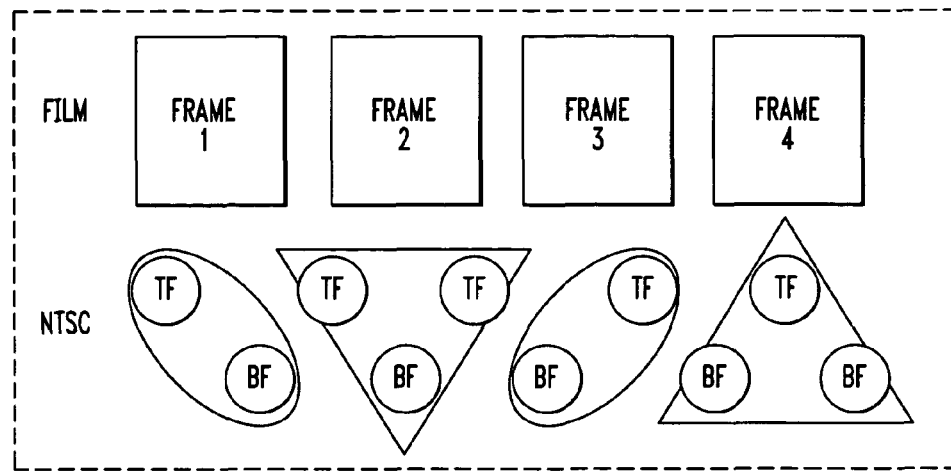
FIG. 1 illustrates an example of a telecine process.
Figure 2:
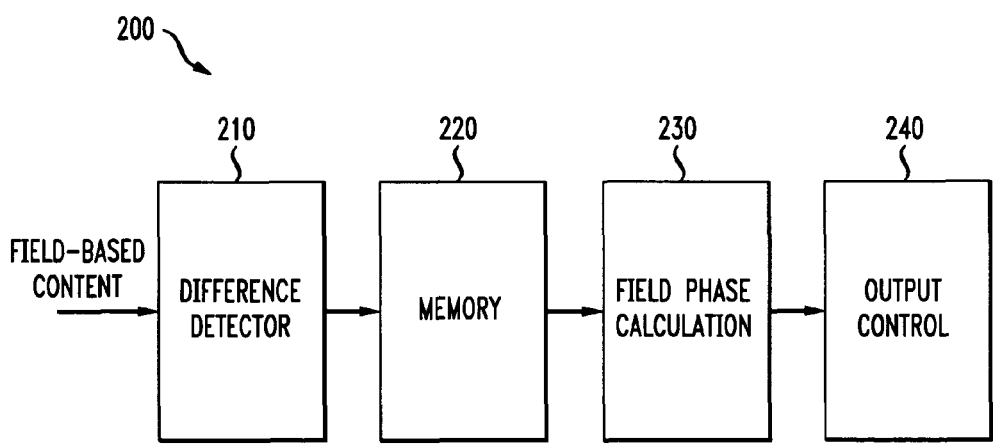
FIG. 2 illustrates an embodiment of a system that identifies a phase of a telecine cadence.

In an inverse telecine process, identification of the proper pulldown cadence is critical to ensuring that adjacent fields are properly combined into a frame. This process of combining fields is also reliant on the identification of a phase for that particular pulldown. If the system can determine the type and phase of pulldown, the original source frames can be reconstructed exactly. Identification of the proper phase can be enabled through a system such as that illustrated in FIG. 2.

As illustrated, phase detection system 200 includes difference detector 210, memory 220, field phase detection 230, and output control 240. Difference detector 210 is generally responsible to search for a repeat field. In general, if there are a large number of large differences between two fields, then there is less probability that the two fields are generated from the same film frame. Identification of such a repeat field is one of the most reliable ways to identify certain cadences, such as a 3:2 pulldown cadence. In this difference detection process, difference detector 210 looks at the luma differences between two consecutive same-polarity fields. These differences are then binned into a histogram, which is stored in memory 220.

Figure 3:
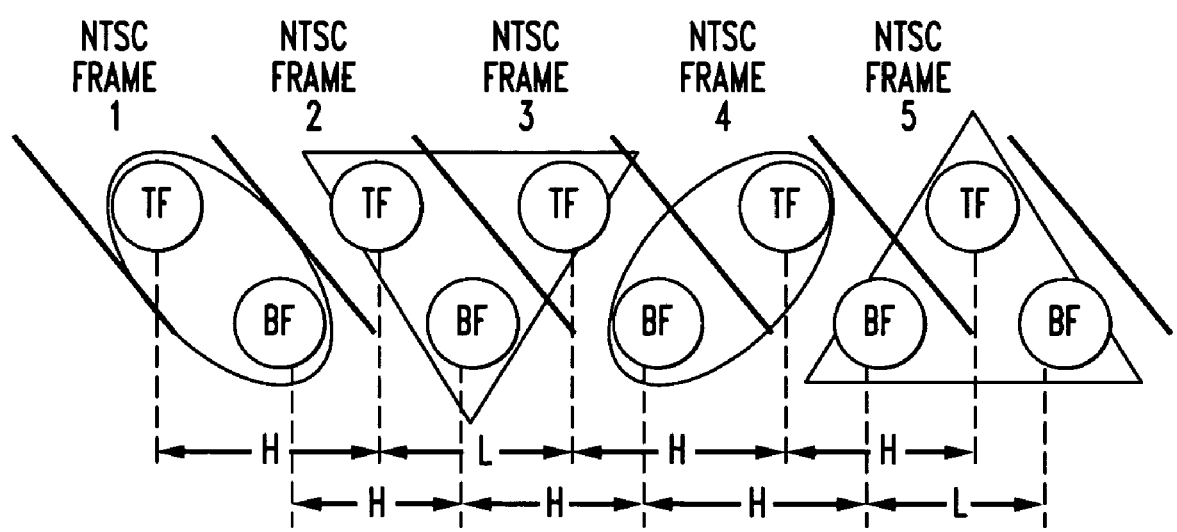
FIG. 3 illustrates an example of difference detector results.

FIG. 3 illustrates an example of the comparison process that is performed by difference detector 210 when examining field-based content generated by a 3:2 pulldown cadence. In this illustration, comparisons are made between two consecutive same-polarity fields. In other words comparisons are made between two consecutive TF fields or between two consecutive BF fields. Beginning from left to right, difference detector 210 would determine that the comparison of TF from NTSC frame 1 and TF from NTSC frame 2 would yield a high (H) difference. Similarly, the comparison of BF from NTSC frame 1 and BF from NTSC frame 2 would yield a H difference. The next comparison would be the TF from NTSC frame 2 with the TF from NTSC frame 3, which would yield a low (L) difference since they are from the same film source frame. From there, the comparison of BF from NTSC frame 2 and BF from NTSC frame 3 would yield a H difference, and the comparison of TF from NTSC frame 3 and TF from NTSC frame 4 would yield a H difference. Together, these five difference determinations (HHLHH) would represent a repeating pattern that would continue along the NTSC fields.

Identification of the repeating pattern enables a lock onto the particular pulldown cadence. This lock, however, is also dependent on the identification of a phase for that particular pulldown cadence. For the 3:2 pulldown cadence, the repeating pattern has five different phases. Identification of the particular phase is performed by field phase calculation module 230.

In general, field phase calculation module 230 is operative to process the histogram bins that were generated by difference detector 210. These histogram bins are retrieved by field phase calculation module 230 from memory 220.

Figure 4:
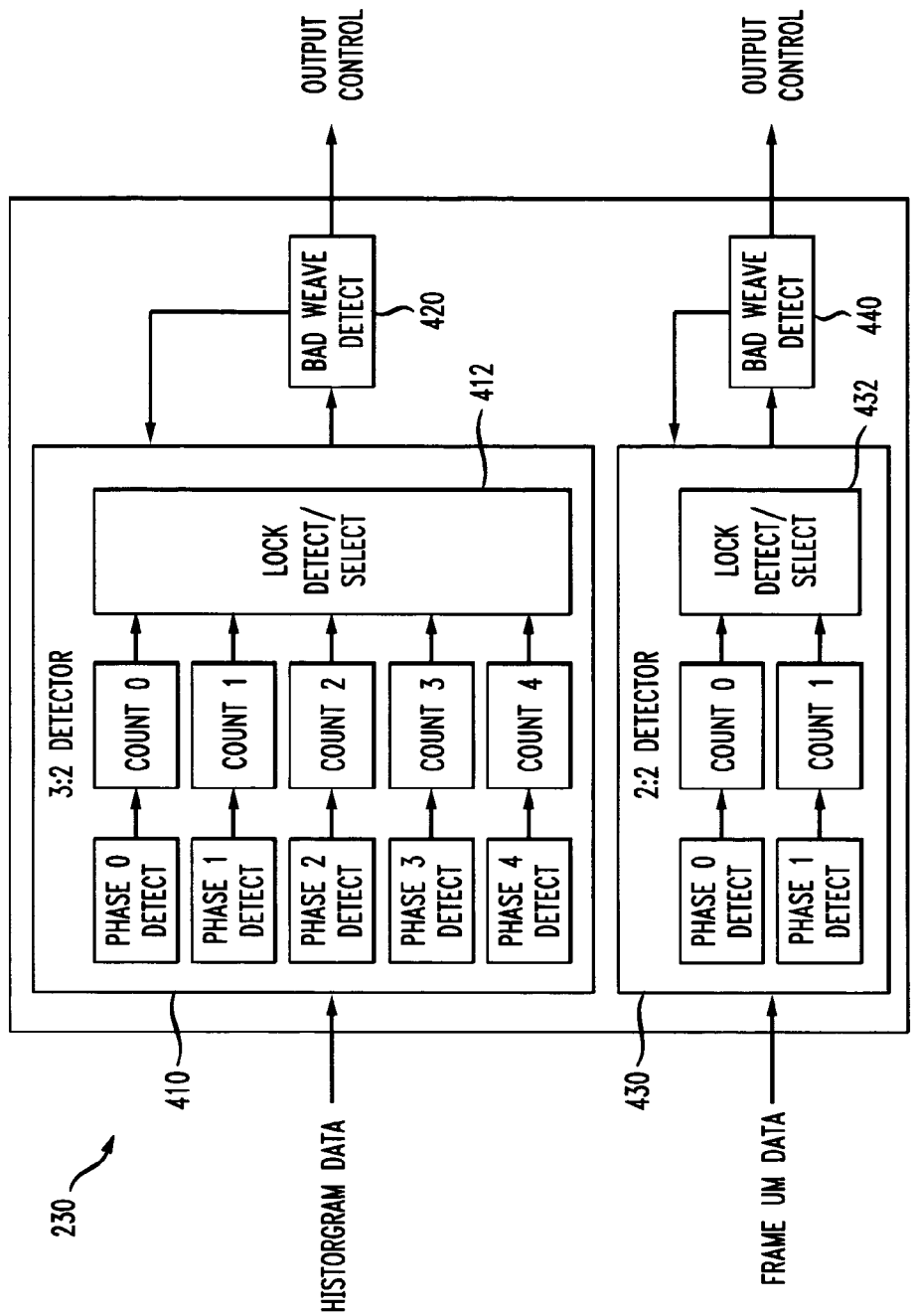
FIG. 4 illustrates an embodiment of a field phase calculation module.

FIG. 4 illustrates an embodiment of phase calculation module 230. As illustrated, phase calculation module 230 includes 3:2 detector 410. As would be appreciated, phase calculation module 230 can be designed to include detectors for any particular pulldown cadence.

As noted, a 3:2 pulldown cadence has five different phases. Each of these five phases are analyzed by an associated phase detector (1-5). In one embodiment, the phase detection for each phase detector is performed using Pearson correlation, wherein the histogram bin data received from memory 220 is processed into a single statistic designed to approximate the standard deviation of the field differences. This single statistic is called sigma and is stored for each field comparison. The system calculates an approximation to the Pearson correlation using the stored sigma values.

Each phase detector compares the Pearson correlation approximation result to a threshold. If the phase detector determines that the correlation is higher than the threshold, then a corresponding phase counter (0-5) is incremented indicating increased confidence in a particular lock point. The phase counters (0-5) are also decremented if the correlation is insufficient. Once a counter exceeds a programmable threshold, lock detect/select module 412 would declare a lock. This lock status would be passed onto bad weave detect element 420 then eventually to output control 240, which controls the weave direction based on the identified cadence and phase.

In general, bad weave detect element 420 is responsible for determining whether the current phase lock is valid or not. Bad weave detect element 420 can include checks for excessive repeat field motion and unexpected motion. Typically, if bad weave detect element 420 determines that the phase lock is invalid, bad weave detect element 420 would signal 3:2 detector 410 to reset the phase counters and change the lock status. The operation of bad weave detect element 420 is described in greater detail below.

As FIG. 4 illustrates, phase calculation module 230 also includes 2:2 detector 430. 2:2 detector 430 performs a 2:2 phase detection in parallel with 3:2 detector 410. In one embodiment, 2:2 detector 430 identifies one of two potential phases based on frame unexpected motion value data. Like 3:2 detector 410, lock detect/select element 432 of 2:2 detector 430 determines whether a value of phase counters 0 and 1 exceeds a programmable threshold. If a value of one of phase counter 0 and 1 exceed the programmable threshold, then lock detect/select module 432 would declare a lock. This lock status would be passed onto bad weave detect element 440 then eventually to output control 240.

Once a lock has been determined, the system knows which direction to weave in order to fill in the missing pixels. If the lock assumption ever proves false, objectionable weave lines appear through objects that are moving. One example of when this might occur is through a bad-edit where a cadence abruptly changes. If the change in cadence is not immediately detected, continued weaving in accordance with the incorrect field phase results would produce objectionable effects.

Other situations in which objectionable weave lines are evident can be a result of poor MPEG encoding. For example, titles (or tickers) that move or fade may be laid over film material. If authored with TV rather than movie equipment, the movement or fading may occur on each field boundary. When this is passed to an "intelligent" MPEG encoder, the encoder can sometimes pick up the strong 3:2 cadence of the underlying film material, resulting in a poor display of the moving text. In general, the editing of telecine video with TV equipment can result in significant issues such as fading titles, cross-fading between different cadences, interlaced text, etc.

In general, when the inverse telecine process weaves lines in the correct temporal direction, vertical resolution is doubled and high quality deinterlaced frames result. If the wrong direction is chosen, visible weave artifacts result through moving objects. One of the purposes of bad weave detect elements 420, 440 is to provide a measure of when an inverse telecine weave is due to happen in the wrong temporal direction.

In a deinterlacer, a motion adaptive deinterlace (MAD) method can provide a good approximation for a pixel. When possible (due to telecine material being present) and when done correctly, the inverse telecine weave is often a better approximation for a pixel. Conversely, when not possible or when done incorrectly, the inverse telecine weave is a worse approximation for a pixel. The difference between the MAD approximation for a pixel and the inverse telecine weave in the correct direction is often small. The difference between the MAD approximation for a pixel and the inverse telecine weave in the incorrect direction is often large.

The goal of bad weave detection is to measure or estimate the degree of bad weave artifacts that would be produced at each output sample if a given combination of fields are woven together. Bad weave artifacts represent the spurious details that would result if two adjacent fields were combined into one frame. For example, fields from different source frames can show bad weave artifacts when there is motion or lighting changes between the source frames. Bad weave artifacts can therefore indicate that the two fields under consideration do not come from the same progressive frame. If the content consists of progressive frames such as 3:2 or 2:2 pulldown, then there should be no bad weave artifacts when fields from the same source frame are combined into a frame.

Figure 5:
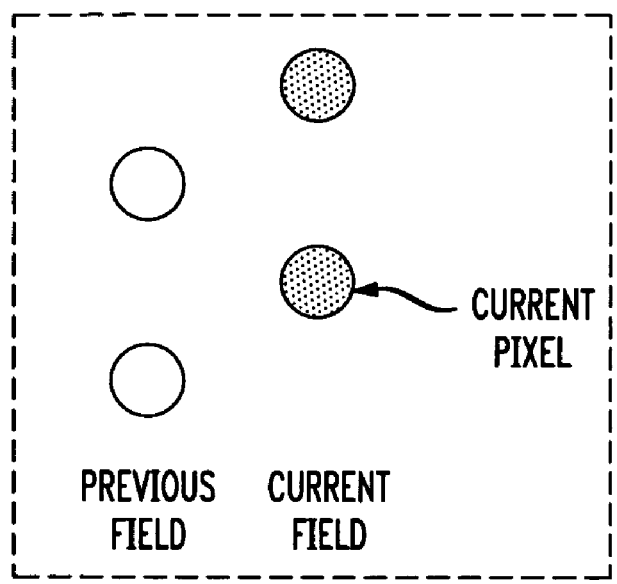
FIG. 5 illustrates a set of pixels used for a polarity change count calculation.

To illustrate a bad weave artifact, consider the pixel example illustrated in FIG. 5. In this illustration, the set of pixels from two fields (two samples from the current field and two samples from the previous field) that fit into a progressive frame are positioned along a vertical column through a region where an artifact occurs. For example, the set of pixels can be positioned on the left edge of an object where there is an alternating pattern of dark and light pixels. Such patterns can be detected from the pattern of differences in values between horizontal lines. In one embodiment, the pixel values are luma values. In another embodiment the pixel values are chroma values. In yet another embodiment, a combination of luma and chroma values can be used.

In accordance with the present invention, a vertical column of pixel sample values is examined. The length of the vertical column can be chosen to be long enough to detect a weave artifact reliably, yet short enough to localize the resulting measurement close to the current pixel sample being analyzed. In one embodiment, a column size of four samples is chosen as is shown in the illustration of FIG. 5. This column size of four samples has proven adequate for reliable detection of bad weaves and reliable discrimination between fields that fit into a progressive frame and those fields that do not. As would be appreciated, a greater number of samples can be used to increase the reliability of detection. However, such an increase in sample set size comes with a higher implementation cost.

To detect the type of bad weave artifact illustrated above, the number of reversals of the difference polarity (DP) between successive lines within a column of samples is counted. Here, the DP refers to the relative difference (positive or negative) between values of a successive pair of pixels along the vertical column. The count of the number of reversals of the DP is referred to as the polarity change count (PCC). In general, the PCC functions as a sensitive and reasonably accurate frequency detector that detects the presence of $1.0\pi$ signals within the column of samples. Detection of the $1.0\pi$ signals is significant because the class of bad weave artifacts typically contains a significant component at $1.0\pi$.

Figure 6:
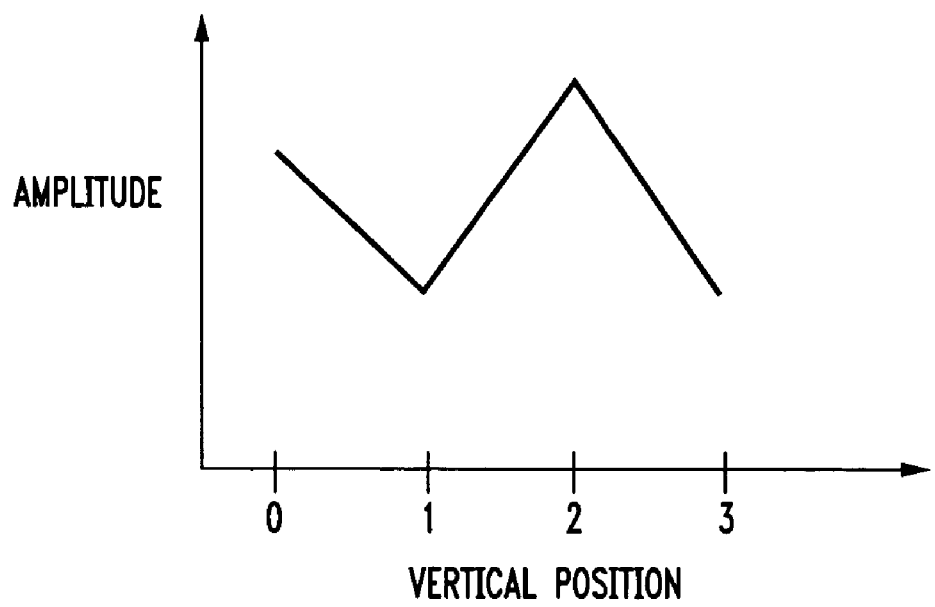
FIG. 6 illustrates an example of pixel values for a polarity change count calculation.

FIG. 6 illustrates a typical, real-world example where a weave artifact is visible at the edge of a moving object. In this graph, the sample numbering scheme is [0, 3] with location 1 representing the location of the current sample. Samples (1, 3) are from the current field, and samples (0, 2) are from the previous field.

In this example, a distinct pattern of alternating up and down relative values is present. The goal of the PCC is to detect this up and down pattern and distinguish it from valid detail. In this example, the DP alternates every sample. Accordingly, for the four samples of FIG. 6 there are three DPs and two consecutive alternations in the DP values. Hence the PCC value in this example is two.

For any given column of four samples, the PCC result takes on one of three possible values: 0, 1, or 2. When counting the number of polarity changes, only consecutive polarity changes are counted.

It should be noted that a difference measurement based purely on polarity would be inherently sensitive to noise. For example, a difference measurement based purely on polarity can be influenced heavily by small difference measures. This situation can lead to the detection of high PCC values even when the content does not have any component at $1.0\pi$. Accordingly, in one embodiment, the PCC incorporates a coring function to eliminate effects of small noise values on the PCC results. In operation, a given difference value between adjacent lines would first be compared to a programmable coring value. If the difference value is less than the coring value, then that difference is ignored. Difference values that exceed the coring value and that lead to a PCC value of two are an indicator of the presence of $1.0\pi$ signals. Hence, each pixel can be counted where the PCC value is equal to two.

In accordance with the present invention, a function PCC (A, B, C, D) can be defined for a set of pixels such as that illustrated in FIG. 6. For the four-pixel set, the variables A, B, C, and D in the PCC function refer to pixel values at vertical positions 0, 1, 2, and 3, respectively. For these four pixel values, the three differences dp1=A−B, dp2=B−C, and dp3=C−D are first calculated. These three differences dp1, dp2, and dp3 represent the relative differences (positive or negative) between values of a successive pair of pixels along the vertical column.

Next, it is determined whether there is a polarity change between successive difference values. This polarity change determination, however, is also subject to the differences exceeding a coring threshold. This polarity change determination can be expressed as follows:

If ((ABS(dp1)>coring) && (ABS(dp2)>coring) && (dp1*dp2<0) then pcc++

If ((ABS(dp2)>coring) && (ABS(dp3)>coring) && (dp2*dp3<0) then pcc++

As expressed, if dp1 and dp2 exceed the coring threshold, and dp1 and dp2 have different polarities, then a pcc counter is incremented. Similarly, if dp2 and dp3 exceed the coring threshold, and dp2 and dp3 have different polarities, then the pcc counter is incremented. Depending on the satisfaction of both of these conditions, the pcc counter can end up with a value of 0, 1, or 2. If the pcc counter ends with a value of 2, then PCC(A, B, C, D) returns a value of 1.

For luma, the results of PCC(A, B, C, D) is summed up for each pixel in the field. Since chroma is in a 4:2:2 format, the chroma PCC function operates on every other pixel horizontally. The chroma PCC(A, B, C D) for each pixel is a 1 if either of the Cr or the Cb components returns a 1 for that pixel. It should be noted that chroma can also be in a 4:4:4 format, in which case the chroma PCC function would operate on every pixel.

Having described the calculation of a PCC, the use of such a PCC function is described in the context of bad weave detection. In accordance with the present invention, the PCC statistics are calculated for five different sets of pixel pairings for each field. In one embodiment, these PCC statistics are based on luma values of the pixels. These five different sets of pixel pairing are referred to as follows:

fFWD (future forward)—sum across the field for all PCC (C, A, D, Z)

fAVG (future average)—sum across the field for all PCC (C, (A+B)/2, D, (Z+P)/2)

FWD (forward)—sum across the field for all PCC(C, B, D, P)

BWD (backward)—sum across the field for all PCC(E, B, F, P)

AVG (average)—sum across the field for all PCC((C+E)/2, B, (D+F)/2, P)

Figure 7:
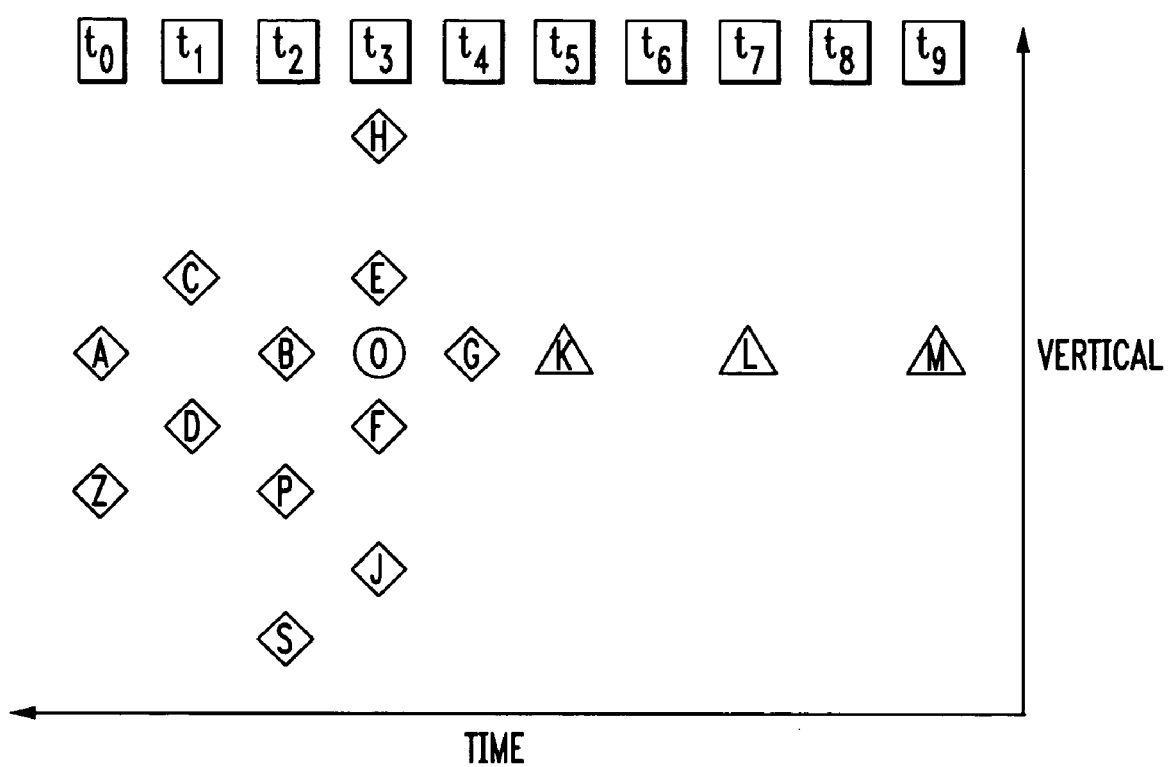
FIG. 7 illustrates an embodiment of a pixel constellation.

Here, the pixels identified in the PCC functions are based on the pixel constellation of FIG. 7. As illustrated, the sets of pixel pairings (C, A, D, Z), (C, B, D, P), and (E, B, F, P) for the fFWD, FWD, and BWD statistics, respectively, are each based on a vertical column of four pixels such as that illustrated in FIG. 5.

When the system is locked to 3:2 pulldown, there are five different phases. Bad weave detect element 420 can then determine for each particular phase whether PCC statistics suggest that a bad weave has been detected. In one embodiment, bad weave detect element 420 determines whether any of the following conditions of Table 1 are met. In Table 1, T1 and T2 are programmable thresholds.

TABLE 1

| 3:2 Field Phase | Condition 1 | Condition 2 | Condition 3 |
|---|---|---|---|
| 0 | FWD>fFWD+T1 | AVG>FWD+T2 | AVG>BWD+T2 |
| 1 | fFWD>FWD+T1 | BWD>FWD+T1 | |
| 2 | FWD>fFWD+T1 | FWD>BWD+T1 | |
| 3 | fFWD>FWD+T1 | BWD>FWD+T1 | |
| 4 | fAVG>FFWD+T2 | fAVG>FWD+T2 | FWD>BWD+T1 |

If any of the conditions of Table 1 are met, bad weave detect element 420 can signal to 3:2 detector 410 to force the system out of 3:2 lock. For example, on receipt of such a signal from bad weave detect element 420, 3:2 detector 410 can be operative to reset all of the phase counters.

When the system is locked to 2:2 pulldown, there are two different phases. Bad weave detect element 440 can then determine for each particular phase whether PCC statistics suggest that a bad weave has been detected. In one embodiment, bad weave detect element 440 determines whether any of the following conditions of Table 2 are met. In Table 2, T3 is a programmable threshold.

TABLE 2

| 2:2 Field Phase | Condition 1 | Condition 2 |
|---|---|---|
| 0 | FWD>BWD+T3 | FWD>fFWD+T3 |
| 1 | BWD>FWD+T3 | fFWD>FWD+T3 |

If any of the conditions of Table 2 are met, bad weave detect element 440 can signal to 2:2 detector 430 to force the system out of 2:2 lock. For example, on receipt of such a signal from bad weave detect element 440, 2:2 detector 430 can be operative to reset all of the phase counters.

As noted, bad weave detection can also be based on chroma values as well. In accordance with the present invention, the chroma PCC (cPCC) statistics can also be calculated for five different sets of pixel pairings for each field. These five different sets of pixel pairing are referred to as follows:

cfFWD (future forward)—sum across the field for all cPCC(C, A, D, Z)

cfAVG (future average)—sum across the field for all cPCC (C, (A+B)/2, D, (P+Z)/2)

cFWD (forward)—sum across the field for all cPCC(C, B, D, P)

cBWD (backward)—sum across the field for all cPCC(E, B, F, P)

cAVG (average)—sum across the field for all cPCC((C+E)/2, B, (D+F)/2, P)

When the system is locked to 3:2 pulldown, the satisfaction of any of the following conditions in Table 3 can force the system out of 3:2 lock. Here, T4 and T5 are programmable thresholds.

TABLE 3

| 3:2 Field Phase | Condition 1 | Condition 2 | Condition 3 |
|---|---|---|---|
| 0 | cFWD>cfFWD+T4 | cAVG>cFWD+T5 | cAVG>cBWD+T5 |
| 1 | cfFWD>cFWD+T4 | cBWD>cFWD+T4 | |
| 2 | cFWD>cfFWD+T4 | cFWD>cBWD+T4 | |
| 3 | cfFWD>cFWD+T4 | cBWD>cFWD+T4 | |
| 4 | cfAVG>cfFWD+T5 | cfAVG>cFWD+T5 | cFWD>cBWD+T4 |

Also, when the system is locked to 2:2 pulldown, the satisfaction of any of the following conditions in Table 4 can force the system out of 2:2 lock. Here, T6 is a programmable threshold.

TABLE 4

| 2:2 Field Phase | Condition 1 | Condition 2 |
|---|---|---|
| 0 | cFWD>cBWD+T6 | cFWD>cfFWD+T6 |
| 1 | cBWD>cFWD+T6 | cfFWD>cFWD+T6 |

As would be appreciated, other conditions can be specified for different pulldown cadences. It is a feature of the present invention that the identification of a bad weave using a PCC can enable the system to abandon weaving based on a lock on the phase of the previously identified cadence. The MAD method can then be used instead to provide a good approximation for a pixel.

In one embodiment, bad weave detectors 420, 440 can be designed to detect a moving ticker over film material. Conventional bad weave detectors often miss the detection of a ticker since the weave caused by the overall cadence (e.g., 3:2) would be much stronger. In this embodiment, PCCs are used, except with a very strong coring value, so that only large magnitude $1.0\pi$ content is detected. This is typically the case with tickers having letters with jagged edges that exhibit strong contrasts between successive pixels in a vertical column.

First, a PCC detector TKR is defined as the sum of all luma PCC(C, B, D, P)+PCC(E, B, F, P) across a field. As noted, this PCC detector would have a very strong coring value. The statistic TKR_BIAS would then be calculated as follows:

$$TK\_BIAS = MIN(TKR*TKR\_PCC\_MULT>>4, 0xFFFF)$$

where TKR_PCC_MULT is a programmable register. The REPF_VETO_LEVEL in the inverse telecine block can then be modified as follows:

$$REPF\_VETO\_LEVEL = MAX(TKR\_MIN\_REPF\_VETO\_LEVEL, REPF\_VETO\_LEVEL - TKR\_BIAS)$$

Specifically, the veto level for the inverse telecine block is lowered by the TKR_BIAS amount up until a minimum value of TKR_MIN_REPF_VETO_LEVEL. The modification of the REPF_VETO_LEVEL represents a change in the threshold in identifying the condition for the inverse telecine block to take the pulldown (e.g., 3:2) out of lock. In effect, the tolerable repeat field motion level is modulated so that unexpected motion in the repeat field can push the system out of lock.

As has been described, the PCCs can be used during the execution phase for bad weave detection. It is a feature of the present invention that the PCCs can also be used to assist in the detection of a telecine cadence. In one embodiment, the telecine cadence detection is implemented in software using statistics that are gathered for each field of data. An example of such a software implementation is illustrated by the example block of code below that is designed to detect a 2:2 cadence. This block of code includes a set of variables that are defined as follows:

```
For index=0:
        match_weave = PCC_LUMA_FFWD;
        non_match_weave = PCC_LUMA_FWD;
        match_UM = FRAME_UNEXPECTED_MOTION_2;
    nonmatch_UM = FRAME_UNEXPECTED_MOTION_3;
For index=1:
        match_weave = PCC_LUMA_FWD;
        non_match_weave = PCC_LUMA_FFWD;
        match_UM = FRAME_UNEXPECTED_MOTION_3;
        nonmatch_UM = FRAME_UNEXPECTED_MOTION_2;
```

```
    For both indexes:
            avg_weave = PCC_LUMA_FAVG;
            pixel_weave = BAD_22_PHASE_DETECT;
            repf_motion = HISTOGRAM_BIN_1 + HISTOGRAM_BIN_2 * 2 +
    HISTOGRAM_BIN_3 * 4 + HISTOGRAM_BIN_4 * 8;
 1  phase_to_use = (fcnt+index)%2
 2  if (LOOPS_RESET & 0x2) // LOOPS_RESET comes from OUTPUT_CONTROL reg
 3      PHASE[phase_to_use] = 0;
 4  else if ((match_weave>MIN_USABLE_PCC) || (nonmatch_weave>MIN_USABLE_PCC))
 5  {
 6      if ((PCC_LUMA_FWD > PCC_LUMA_FFWD) && ((pixel_weave << 8) > match_weave *
 7  PW_MATCH_MULTIPLIER))
 8          PHASE[phase_to_use]--;
 9      else if ((nonmatch_weave << 1) > (match_weave * PCC_NONMATCH_MATCH_RATIO))
10      {
11          if(match_weave > HISTOGRAM_BIN_4 * HISTOGRAM4_RATIO +
12  HISTOGRAM4_OFFSET)
13              PHASE[phase_to_use] = PHASE[phase_to_use] - HISTOCHECK_DEC;
14              else if((match_weave > RM_CHECK_THRESH) && ((match_weave *
15  RM_CHECK_RATIO) > repf_motion))
16              PHASE[phase_to_use] = PHASE[phase_to_use] - HISTOCHECK_DEC;
17          else
18              PHASE[phase_to_use]++;
19      }
20      else if(match_weave > nonmatch_weave + WEAVE_22_THRESHOLD)
21          PHASE[phase_to_use]--;
22  }
23  else if ((match_UM > UPPER_MATCH_THRESH) || (match_UM > nonmatch_UM))
24      PHASE[phase_to_use] = 0;
25  else if ((match_UM < UPPER_MATCH_THRESH) && (nonmatch_UM >
26  LOWER_NONMATCH_THRESH))
27  {
28      if ((nonmatch_UM << 1) > (NONMATCH_MATCH_RATIO * match_UM))
29          PHASE[phase_to_use]++;
30      else if (REV22_LOCKED==0)
31          PHASE[phase_to_use]--;
32  }
33  else
34          PHASE[phase_to_use]--;
```

In this example software implementation, the first check at line 4 determines whether or not there are enough PCC events to indicate that reliable statistics are being produced. If the number of PCC events indicate that the statistics are not reliable, then the software would fall back on the block of code at lines 23-32. This block of code at lines 23-32 represents a software implementation of the hardware detection implemented by hardware detector 430 (see FIG. 4), which is based on the frame unexpected motion data represented by variables match_UM and nonmatch_UM. In an embodiment where the cadence detection is implemented in software such as that illustrated above, the hardware results of hardware detector 430 can be ignored.

If the number of PCC events suggest that reliable statistics are produced, then the software process proceeds to the determination at lines 6-7. This determination is designed to make sure that the pixel_weave counts are in relation to the actual PCC value in the match direction. As noted above, pixel_weave is based on BAD_22_PHASE_DETECT, which is a statistic calculated across four fields, that increments, for example, whenever the future forward and backward PCCs are true, but the forward PCC is not. In other words, BAD_22_PHASE_DETECT is the count of pixels in a field where (PCC(C,A,D,Z)=true) and (PCC(E,B,F,P)=true) and (PCC(C,B,D,P)=false). If the determination at lines 6-7 is true, then the phase counter is decremented. Otherwise, the software process proceeds to the next determination at line 9.

The determination at line 9 is designed to test the ratio of PCCs in the direction the system would like to weave versus the direction the system would not like to weave. If the PCCs are too high in the direction the system wants to weave, the system may decrement the phase counter (see lines 20-21).

Next, at lines 11-12, the software examines the largest interframe differences (histogram bin 4) to determine its impact on weaving. Here, larger interframe differences produced by motion, would require a relatively larger number of PCCs before the system would decrement the phase counter. Thus, if there are small interframe differences but larger number of PCCs, the system would back out of lock quickly with a large phase counter decrement. The next determination at lines 14-15, is similar to the determination at lines 11-12. Here, the determination is based on repf_motion, which is derived from more histogram values. Again, small interframe differences with a larger number of PCCs would cause the system to back out of lock quickly with a large phase counter decrement.

As this example illustrates, PCCs can be used as part of a cadence detection process. This cadence detection process can be defined to detect any of a variety of cadences (e.g., 2:2, 3:2, etc.). Moreover, while this detection process can be implemented in software as described above, it can also be embodied as part of a hardware cadence detector that operates on statistics stored in memory.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method for detecting a cadence of interlaced video, comprising:
performing by one or more processors and/or circuits, functions comprising:
selecting pixels from two different fields of interlaced video, said selected pixels being aligned vertically in a frame of video;
determining a difference polarity between values of each successive pair of pixels along said vertical alignment;
identifying a number of reversals in said difference polarity determinations between successive pairs of pixels along said vertical alignment; and
determining whether a weave artifact is detected based on conditions involving said identified number of reversals; and
taking a video processor out of lock on a previously identified cadence if said weave artifact is detected.

2. The method of claim 1, wherein said selecting comprises selecting four pixels.

3. The method of claim 1, wherein said determining comprises determining a difference polarity between luma values of a pair of pixels.

4. The method of claim 1, wherein said determining comprises determining a difference polarity between chroma values of a pair of pixels.

5. The method of claim 1, wherein said determining is based on a condition that compares an identified number of reversals for two distinct sets of pixels, wherein each set includes pixels from two different fields.

6. The method of claim 5, wherein said condition is defined for a particular field phase.

7. A method for detecting a cadence of interlaced video, comprising:
performing by one or more processors and/or circuits, functions comprising:
selecting pixels from two different fields of interlaced video, said selected pixels being aligned vertically in a frame of video;
determining a difference polarity between values of each successive pair of pixels along said vertical alignment;
identifying a number of reversals in said difference polarity determinations between successive pairs of pixels along said vertical alignment; and
determining whether to increment or decrement a phase counter associated with a phase of a cadence of interlaced video based on said identified number of reversals.

8. The method of claim 7, wherein said selecting comprises selecting four pixels.

9. The method of claim 7, wherein said determining comprises determining a difference polarity between luma values of a pair of pixels.

10. The method of claim 7, wherein said determining comprises determining a difference polarity between chroma values of a pair of pixels.

11. The method of claim 7, further comprising locking to said cadence if said phase counter exceeds a threshold value.

12. A system for detecting a cadence of interlaced video, comprising:
memory for storing pixel values in accordance with a pixel constellation, said pixel constellation identifying the relative vertical positioning of pixels in a plurality of fields relative to a current pixel position, wherein said pixel constellation includes at least four consecutive pixel positions that are vertically aligned across two different fields;
a polarity change counter that determines a number of reversals in difference polarity along said at least four consecutive pixel positions that are vertically aligned, wherein a difference polarity is a difference between values of a successive pair of pixels; and
a cadence determination element that determines a cadence of the interlaced video using an output of said polarity change counter.

13. The system of claim 12, wherein said pixel values are luma values.

14. The system of claim 12, wherein said pixel values are chroma values.

15. The system of claim 12, wherein said determined cadence is used to detect a presence of a telecine cadence.

16. The system of claim 15, further comprising a phase detector and a counter for each phase of a telecine cadence.

17. The system of claim 12, wherein said determined cadence is used to detect a bad weave.

* * * * *